United States Patent [19]

Lee et al.

[11] Patent Number: 5,991,894
[45] Date of Patent: Nov. 23, 1999

[54] PROGRESSIVE REDUNDANCY TRANSMISSION

[75] Inventors: Jack Y. B. Lee, Kwun Tong; P. C. Wong, City One Shatin, both of The Hong Kong Special Administrative Region of the People's Republic of China

[73] Assignee: The Chinese University of Hong Kong, Shatin, The Hong Kong Special Administrative Region of the People's Republic of China

[21] Appl. No.: 08/870,611

[22] Filed: Jun. 6, 1997

[51] Int. Cl.⁶ .................................................. G06F 11/16
[52] U.S. Cl. .......................... 714/6; 714/7; 714/8; 714/11
[58] Field of Search ................... 395/182.02, 182.04, 395/182.05, 182.06, 200.33, 181, 182.01, 182.09; 371/37.7

[56] References Cited

U.S. PATENT DOCUMENTS

| | | | |
|---|---|---|---|
| 4,761,785 | 8/1988 | Clark et al. | 371/51 |
| 4,993,030 | 2/1991 | Krakauer et al. | 371/40 |
| 5,130,992 | 7/1992 | Frey, Jr. et al. | 371/401 |
| 5,140,689 | 8/1992 | Kobayashi | 395/575 |
| 5,202,799 | 4/1993 | Hetzler et al. | 360/48 |
| 5,442,752 | 8/1995 | Styczinski | 395/404 |
| 5,446,736 | 8/1995 | Gleeson et al. | 370/85.13 |
| 5,504,859 | 4/1996 | Gustafson et al. | 395/182.09 |
| 5,519,435 | 5/1996 | Anderson | 348/8 |
| 5,519,844 | 5/1996 | Stallmo | 395/441 |
| 5,537,567 | 7/1996 | Galbraith et al. | 395/441 |
| 5,566,297 | 10/1996 | Devarakonda et al. | 395/182.13 |
| 5,586,264 | 12/1996 | Belknap et al. | 395/200.08 |
| 5,613,059 | 3/1997 | Stallmo et al. | 395/182.04 |
| 5,737,549 | 4/1998 | Hersch et al. | 395/309 |

OTHER PUBLICATIONS

Lee, Y.B. et al., "A Server Array Approach for Video–on–demand Service on Local Area Networks" 1966 INFOCOM Mar. 1996, pp. 49–56.

Lee, Y.B. et al., "VIOLA: Video on Local–Area–Networks" Jun. 1995 Business & Technology Information Quarterly HKITCC, vol. 1 #2, pp. 1–16.

Tewari et al., "High Availability in Clustered Multimedia Servers" Mar. 1996 IEEE, Proceedings of the Twelfth Intl Conference on Data Engineering, pp. 645–654.

Lee et al., "A Server Array Approach for Video–on–demand Service on Local Area Networks" Mar. 1996 IEEE, pp. 27–33.

Vin et al., "Designing a Multiuser HDTV Storage Server" Jan. 1993 IEEE Journal on Selected Areas in Communications, vol. 11, No. 1, pp. 153–164.

(List continued on next page.)

Primary Examiner—Robert W. Beausoliel, Jr.
Assistant Examiner—Andy Nguyen
Attorney, Agent, or Firm—Fliesler Dubb Meyer & Lovejoy LLP

[57] ABSTRACT

A method to recover lost data in a piece of information transmitted from a number of server computers to a client computer. The method includes the steps of transmitting by the server computers a piece of server data to the client computer. The piece of server data includes the piece of information and at least one redundant symbol. Due to the failing of at least a part of one of the server computers, data are lost. The client computer identifies such a loss. The client computer recovers the lost data using the one or more redundant symbols. Then, the remaining non-failing server computers transmit another set of server data, which include another piece of information with at least one additional redundant symbol over what was previously transmitted to the client computer. This will ensure that the client computer can recover additional data lost due to the failing of at least a part of another server computer. In another embodiment, the one or more redundant symbols are not transmitted until the client computer identifies that data are lost.

18 Claims, 10 Drawing Sheets

OTHER PUBLICATIONS

Birk, "Random RAIDs with Selective Exploitation of Redundancy for High Performance Video Servers" May 1997 IEEE Proceedings of the IEEE 7th International Workshop on Network and Operating System Support for Audio and Video, pp. 13–23.

Gemmell et al., "Multimedia Storage Servers: A Tutorial" May 1995 Computer, vol. 28, Iss. 5, pp. 40–49.

Vin et al., "Efficient Failure Recovery in Multi–Disk Multimedia Servers" Jun. 1995 Twenty–Fifth International Symposiumon Fault–Tolerant Computing, IEEE, pp. 12–21.

PROGRESSIVE REDUNDANCY TRANSMISSION

BACKGROUND

The present invention relates generally to using an array of servers to transmit information to one or more clients, and more particularly to recovering lost data due to failure in servers.

The data networking industry has been growing at a tremendous rate. In the corporate space, local area networks (LANs) have become mission critical tools for basic business operations, and corporate communication. In the public space, the explosion of Internet usage and telecommuting has fueled demand for networking products.

One primary driver of the increase in data networking is the increase in the number of end users attached to LANs and wide area networks (WANs). In the past few years, we have seen a dramatic increase in the number of individuals accessing the Internet. The graphically-based, easy to use web browsers have transformed the Internet from a communication tool for a select group of elitists to a popular communications medium. To improve employee productivity, reduce costs and remain competitive, many corporations have been promoting remote LAN connectivity. Businesses are demanding high-speed access to information from a variety of locations. Companies are increasingly providing employees with communications tools that allow them to access corporate databases from branch offices or send electronic mails and transfer files from their laptops while traveling.

Not only has the number of end users increased tremendously, the amount of data being transferred have also been surging in an alarming rate. The increasing focus on multimedia in the World Wide Web is causing larger and larger files of data to be transferred across the Internet. Historically, information on the Web was heavily text-based. As the Internet user base grows, graphic files have become more and more common. Such files require tremendously more data than texts. For example, a page of text may only occupy a few kilobytes, while a picture requires a few megabytes, and a compressed movie a gigabyte. All these create a huge demand for large networks.

Many networks ultimately connect to personal computers, accessed by users. Such personal computers are sometimes known as client computers. These client computers are connected to server computers, which hold much more information. Actually, the ease of retrieving multimedia information on-line using a client-server model has become the norm of most networking applications.

Many of today's servers run on a single machine connected to a network. The idea is that the servers do not fail. Most of the problems are perceived to come from the transmission media If a client does not receive any part of a piece of information, the client will ask the server to re-transmit, because, probably, the transmission media have lost packets of the information. Servers are assumed to operate without malfunctioning. However, servers do fail. When they fail, the information in them is lost. To remedy this problem, one may replicate data on several servers. This type of technique is known as service replication, which can increase the original storage by a few times. With multimedia data typically requiring significant amount of storage, service replication might take too much storage space.

There is another prior art technique known as service partitioning, where data are partitioned and distributed among server clusters. This technique has previously been described, for example, in "Design and Implementation of the SUN Network File System," written by Sandberg et. al. and published in *In Proceedings of the Summer Usenix Conference* on 1985. Service partitioning allows the loading to be shared by several servers. However, if a server among the cluster of servers is down, information is again lost.

Another problem encountered in server failure is the disruption in information flow. For video-on-demand services, the video signals have to be continuous. We do not want to watch a movie that breaks or slows down in the middle due to server failure.

It should be apparent from the foregoing that there is still a need to protect information loss due to server failure. The protection mechanism should not significantly increase server storage, and should maintain continuous information flow if there is failure in servers. With networks permeating into every corner of our society, such needs will only increase as time goes by.

SUMMARY OF THE INVENTION

The present invention provides a method to protect information loss due to failure in at least a part of a server. The protection mechanism only leads to slight increase in server storage. Also, information flow at the client side can be continuous, with the users not even aware of server failures.

In a first embodiment, server computers transmit a piece of server data to one or more client computers. The server data include a piece of information and at least one redundant symbol. Due to the failing of at least a part of one of the server computers, the client computer identifies lost data in the server data. The part failed can be the memory storage area, the software in the server or others. The client computer then recovers the lost data based on the received server data. From this point onwards, server data from the remaining working server computers include at least one additional redundant symbols. This will ensure that the client computer can recover additional data lost due to the failing of at least a part of another server computer.

In a second embodiment, at first, the server data transmitted by the server computers to the client computer only include the piece of information. Again, the client computer has identified lost data in the server data due to the failing of at least a part of one server computers. At this point, the working server computers transmit at least one redundant symbol over what have previously been transmitted to the client computer. This is for recovering the lost data using the one or more redundant symbols. Then, the remaining working server computers transmit another set of server data to the client computer. That set of server data includes another piece of information and the at least one additional redundant symbol.

In the above embodiments, the increase in server storage due to the redundant symbol is minimal. Also, though one might store more than one redundant symbols, one does not have to transmit all the stored redundant symbols for each piece of information to protect against failure in one server. The additional storage is to prepare for additional server failure.

In the first embodiment, with a (N, N−k) RS-code or Reed-Solomon code, and with r redundant symbols per stripe of N symbols transmitted, (a) the embodiment can sustain up to r servers failing simultaneously, (b) the embodiment can recover from k failing servers, (c) the redundancy transmission overhead is r/(N−k), and (d) the redundancy storage overhead is k/(N−k).

For example, with a (15,11) RS-code, during normal operation, and with only one redundant symbol transmitted for the transmission of every 11 information symbols, this translates to (a) a 9% transmission overhead—(1/11) or (one redundant symbol over eleven information symbols); and (b) a 36% storage overhead—(4/11) or (four redundant symbols over eleven information symbols). In this example, 4 failing servers can be tolerated.

This is a significant reduction in overhead over prior art service replication technique. For service replication, each replication requires an additional copy of all data. Hence each replica requires a 100% increase in overhead. To cater for up to 4 failing servers, one needs 400% increase in overhead!

Sometimes, though not often, more than one server can fail simultaneously. To cover for simultaneous failure, the present invention allows sending two or more redundant symbols with the piece of information.

In another embodiment, the invented method also ensures that pieces of information presented at the client computer are continuous even when a server computer fails. For example, in the first embodiment, when a server computer fails, the client computer has to re-construct the lost data based on the server data. In this embodiment, during the failure period, the client computer still presents information in a continuous manner. Such continuity is important for video signals where viewers cannot tolerate disruption in or slowing down of the signals presented.

To ensure continuity, the client computer keeps a pipeline filled with the received information before presenting them when there is no failure in any server. The amount of the pipeline filled depends on factors, such as (1) the maximum duration in time between the client requesting a striping unit from a server, and the client receiving the unit; and (2) the time required by the client computer to present one piece of information. In one embodiment, the client computer includes a buffer with sufficient size to at least store the received information. In yet another embodiment, the amount of the pipeline filled also depends on the number of redundant symbols transmitted with each piece of information so that information presented by the client computer is continuous even when there is server failure.

Other aspects and advantages of the present invention will become apparent from the following detailed description, which, when taken in conjunction with the accompanying drawings, illustrates by way of example the principles of the invention.

Same numerals in FIGS. 1–10 are assigned to similar elements in all the figures. Embodiments of the invention are discussed below with reference to FIGS. 1–10. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
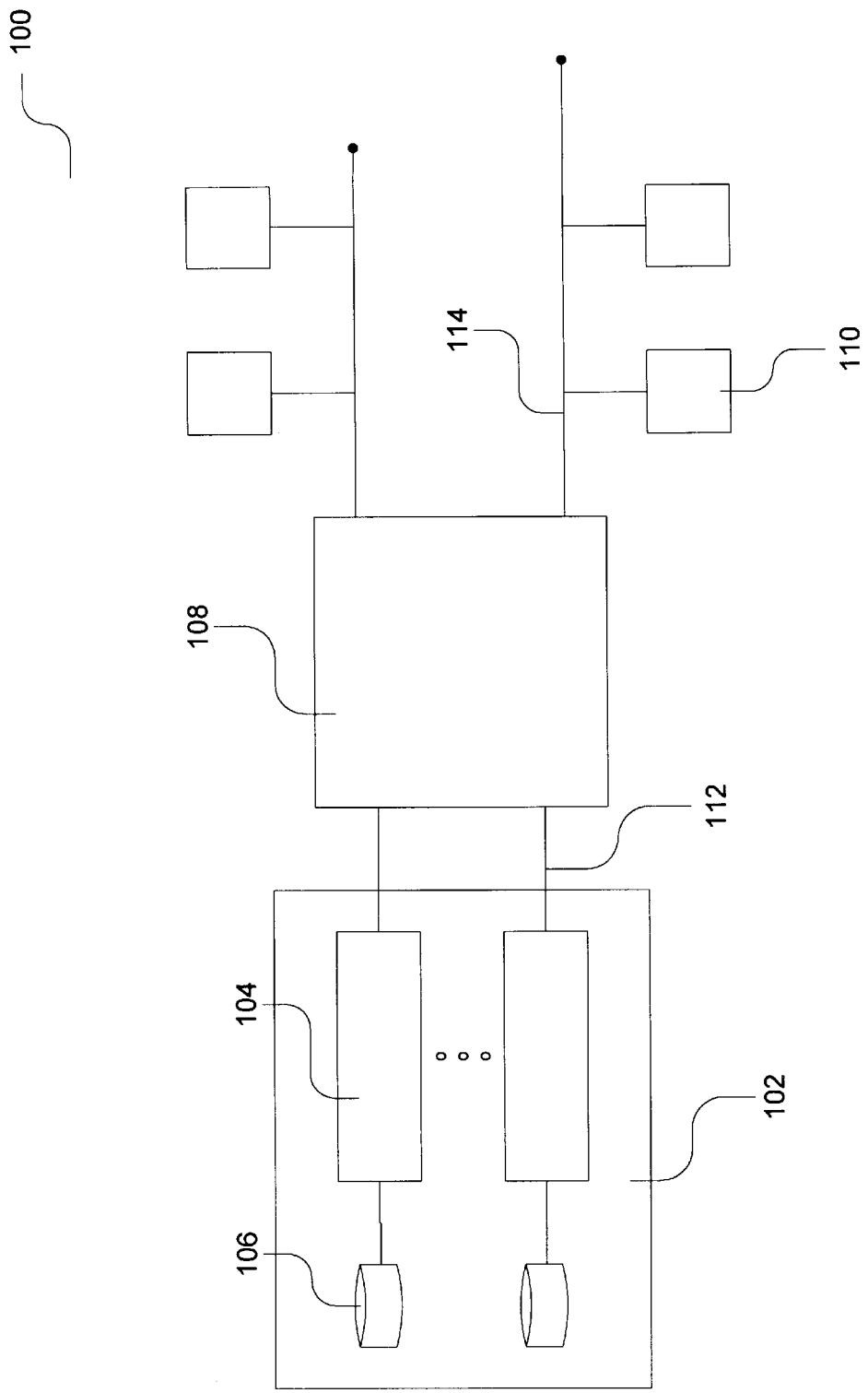
FIG. 1 shows one embodiment implementing the present invention.

FIG. 1 shows one embodiment implementing the present invention. The invention includes a number or an array 102 of servers. Each server has a storage medium, such as the server 104 having a storage medium 106. A packet switch connects the array of servers to a number of client stations, such as the client computer 110. The switch can be an ethernet, fastethernet, asynchronous-transfer-mode (ATM) switch. The servers may be assigned with one or more high-speed links, such as 112, with a number of clients sharing a single low-speed link, such as 114. The embodiment is scalable. If there is a need for additional servers or clients, one can put in additional servers or clients with appropriate linkage and switch.

Figure 2:
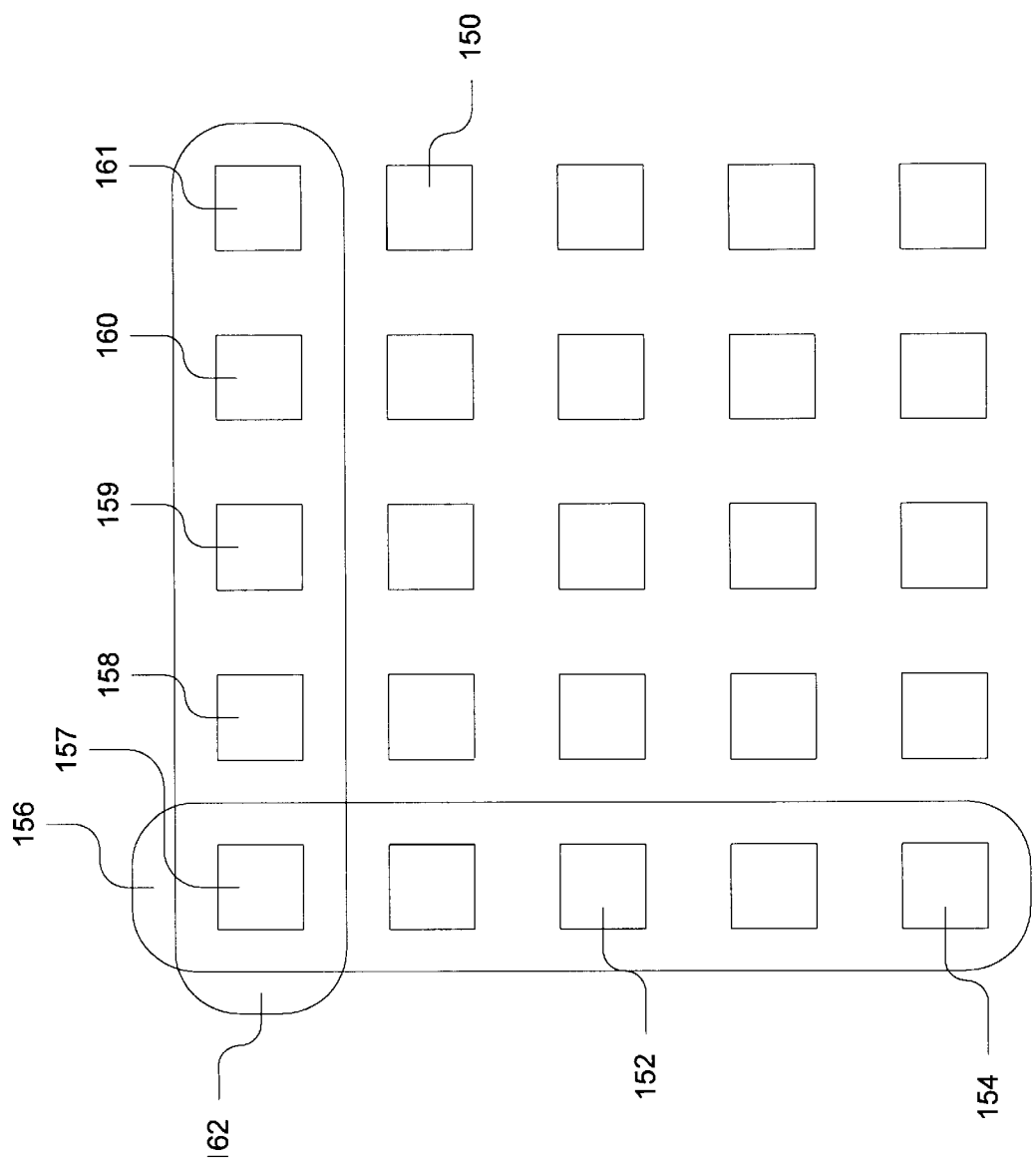
FIG. 2 shows one embodiment of striping units in the present invention.

In one embodiment, a piece of information is distributed among a number of servers to ensure load sharing. FIG. 2 shows one way to stripe a piece of information. Each box in FIG. 2 denotes a stripe unit, such as 150, which denotes a number of bytes of data, such as 64 Kilobytes. Each stripe unit stores one or more symbols. Each vertical column of stripe units denotes the units stored within one server; for example, the units 152 and 154 are in the server 156. With five columns shown in FIG. 2, there are five servers. Each row of stripe units represent a stripe; for example, the units 158 and 160 are two units for the stripe 162. Each stripe includes a piece of information. For example, the stripe 162 includes four stripe units 157–160, which represent a piece of information.

A server can fail, or a part of a server can fail, which can be a server's storage medium, an application program in the server or other parts of the server. The embodiment shown in FIG. 2 protects against server failure by including redundant symbols. It is a fault-tolerant system. For example, the stripe 162 includes one redundant symbol in the stripe unit 161. In this invention, the data in one stripe, such as the stripe 162, is known as a piece of server data.

In the example shown in FIG. 2, if there is failure in one server out of the five, based on the redundant symbol in each stripe, such as the symbol 161 in the stripe 162, information in the failed server can be re-constructed. If a user prefers higher fault-tolerance, the user can designate more than one servers to hold redundant symbols. For example, if two servers hold redundant symbols, then two out of the five servers can fail simultaneously, and their lost data can be reconstructed. To re-construct lost data based on redundant symbols should be obvious to those skilled in the art, and can be found, for example, in the article, entitled, "A Case for Redundant Array of Inexpensive Disks (RAID)," written by Patterson, Gibson, and Katz; and published in *Proc. ACM SIGMOD Conference,* pp.109–116, on June 1988.

Figure 3:
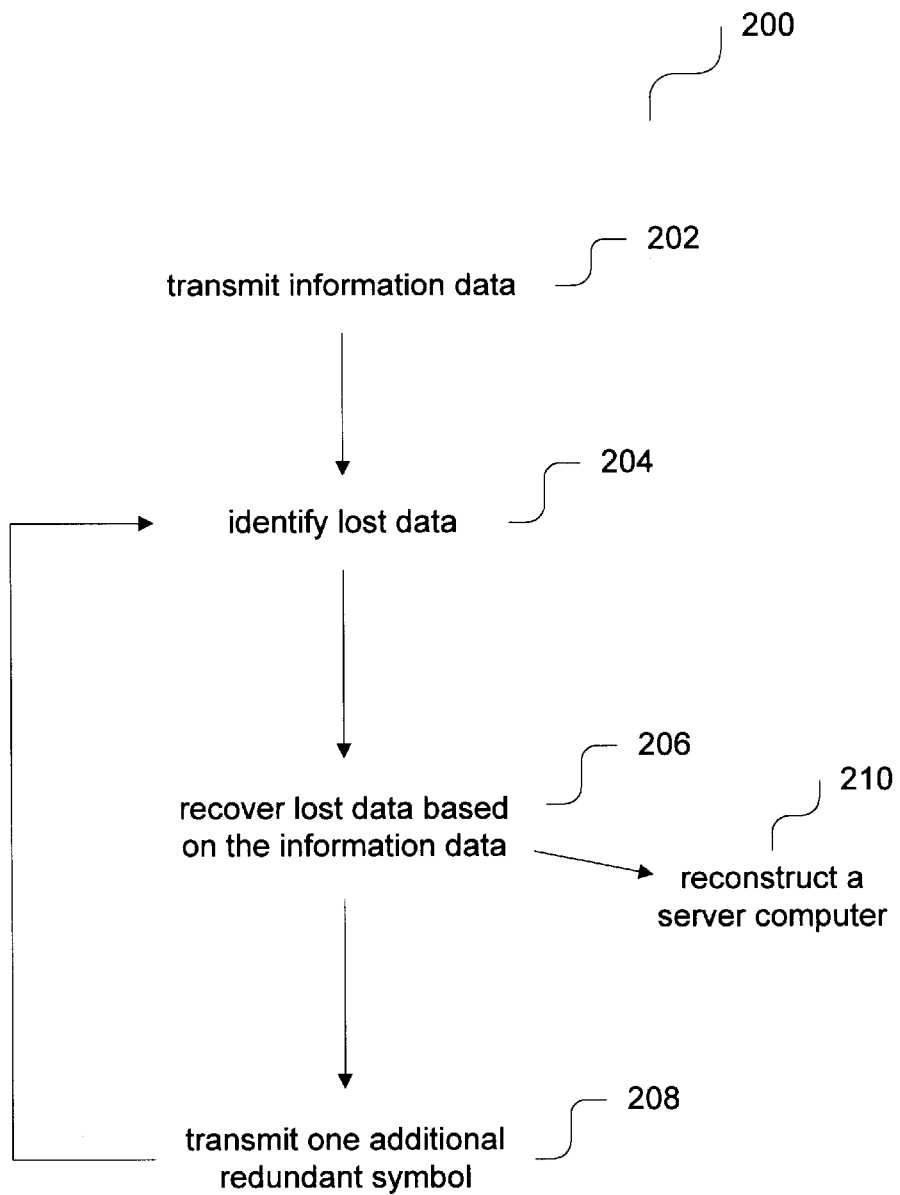
FIG. 3 shows one set of steps to implement one embodiment of the present invention.

FIG. 3 shows one set of steps 200 to implement one embodiment of the present invention. In this embodiment, one or more redundant symbols are always transmitted, and is known in the present invention as forward-erasure approach. First a client computer requests server data from a number of servers. This can be done sequentially. In view of the requests, the server computers transmit (step 202) a piece of server data to the client computer. The server data include a piece of information and at least one redundant symbol. The piece of information is made up of one or more symbols, residing in striping units. One transmission mechanism can be found, for example, in "A Server Array Approach for Video-on-demand Service on Local Area Networks," written by Lee and Wong, and published in *INFOCOM* '96, on March 1996.

In this embodiment, at least one redundant symbol is always included in the server data. If the user prefers higher degree of fault-tolerance, she can increase the number of redundant symbols to be transmitted with the server data. For example, with a (15,11) RS-code, the server data include 11 symbols for a piece of information, and 4 symbols for redundancy. With 4 symbols for redundancy transmitted, this embodiment can withstand 4 servers failing simultaneously. Anyway, at least one redundant symbol is always transmitted to the clients in the embodiment disclosed in FIG. 3.

Figure 4:
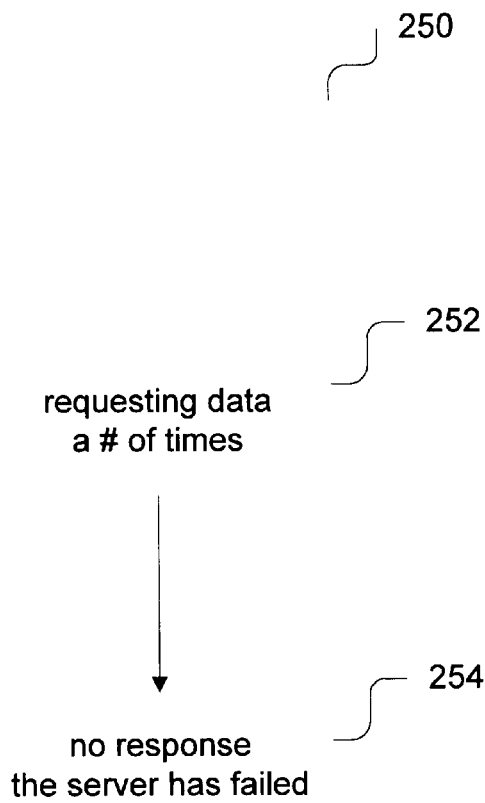
FIG. 4 shows a representation of a Reliable Datagram Protocol in the present invention.

Due to the failing of at least a part of one of the server computers, data are lost. The client computer identifies (step 204) that data are lost. In one embodiment, the identification process is based on a protocol known as a Reliable Datagram Protocol. FIG. 4 shows a representation 250 of such a protocol. The client computer requests (step 252) data from a server computer. If the server computer is functional, it will send back an acknowledgment packet. If the server computer does not, the client computer will re-transmit the request. If the client computer does not receive (step 254) the acknowledgment packet after re-transmitting the request a number of times, the client declares that the server has failed, with the requested data lost. The time to detect a server failure is known as the failure detection time $T_{DETECT}$; it depends on a user-defined number, which sets the number of request re-transmitted before declaring server failure.

The client computer then recovers (step 206) the lost data based on the server data. For example, if the server holding the stripe unit 159 has failed, the client computer can re-construct data in the stripe unit 159 based on data in the stripe units 157, 158, 160 and 161. Note that the stripe unit 161 includes a redundant symbol.

With one server failed, the next set of server data transmitted (step 208) by the working server computers includes at least one additional redundant symbol over what was previously transmitted. This will again allow the client computer to recover additional data lost due to the failing of at least a part of another server computer. The steps can then repeat with the client computer identifying lost data.

In the above embodiment, one or more redundant symbols are always transmitted. The benefit of always transmitting redundant data is that the client can re-construct data lost using the received redundant symbol. Another benefit of the present invention is that a user can control the degree of redundancy. If the probability of having two or more servers failing simultaneously is low, the user can limit the number of redundancy symbol transmitted in each stripe to one. If the user prefers higher degree of fault-tolerance at the expense of overhead in servers and client bandwidth, the user can transmit more redundancy symbol in each stripe. In one embodiment, with a (N, N-k) RS-code, if r redundant symbols per stripe of N symbols are transmitted, (a) the embodiment can sustain up to r servers failing simultaneously, (b) the embodiment can recover from k failing servers, with the k servers not failing simultaneously, unless r is equal k, (c) the redundancy transmission overhead is r/(N-k), and (d) the redundancy storage overhead is k/(N-k).

At step 202, the user is not limited to transmitting one redundancy symbol. The following table is an example with two redundant symbols transmitted. It is based on a (15, 11) RS-code:

| Event | Units transmitted per stripe |
|---|---|
| No server failure | 11 + 2 = 13 |
| Two servers fail simultaneously | 11 + 2 − 2 = 11 |
| With 11 symbols, can recover from failure | |
| Transmit two more redundant symbols. | 11 + 2 − 2 + 2 = 13 |
| One more server fails | 11 + 2 − 2 + 2 − 1 = 12 |
| Cannot transmit additional redundant units. | |
| Another server fails | 11 + 2 − 2 + 2 − 1 − 1 = 11 |
| | Can still recover from failure |
| Yet another server fails | 11 + 2 − 2 + 2 − 1 − 1 − 1 = 10 |
| | With 10 symbols, cannot recover from failure |

In the above example, the embodiment can tolerate up to two simultaneous server failures and up to a total of four server failures.

In another embodiment, after the client computer recovers the lost data due to the failure of a server, the recovered data are used to re-construct (Step 210) a server computer to replace the failed one. In one embodiment, this re-construction process is done without affecting normal server operation. There are a number of methods to re-construct that server. In one approach, all the working servers send their storage data to a spare server, which will compute to recover the lost block. In another approach, each working server performs a part of the reconstruction process. For example, each working server receives data from its adjacent working server in its left, performs the computation to recover the lost data, and transmits its results to its adjacent working server in its right. The spare server is the server on the far-right. Once re-construction is completed, the spare server replaces the failed server.

After receiving information, the client computer presents it, such as, for playback. In one embodiment, the signals presented by the client computers are continuous, non-interrupted and not delayed even if one or more of the servers fail. This embodiment is especially suitable for video signals or video streams where viewers can even sense minor slowing down in the signals.

In this embodiment, the client computer retains a number of striping units before presenting any information if there is no failure in any server. In other words, the client computer almost fills up a pipeline of striping units before presenting any information—the reason behind not totally filling up the pipeline will be discussed later. Note that the information presented by the client company may be in more than one striping units. For example, if one server fails, before the client computer can present any information, the client computer might have to analyze striping units in an entire stripe to recover the lost data.

As the client computer presents information, the client computer receives another striping unit from a server. In order to ensure the client computer has room to receive the striping unit, the buffer or pipeline in the client is not totally filled before information is presented. In one embodiment, the client computer has a buffer that can hold a number B of striping units. After the client computer has received (B−1) units, the client computer starts presenting the received information.

The benefit of retaining a number of units before presenting is that if a server fails, the units received can keep on presenting without interruption by depleting the buffer. In this embodiment, as long as there is a striping unit left in the buffer for use in playback, the stream of data presented will maintain its continuity. Thus, before the buffer is fully depleted, the lost data should have been recovered, with the pipeline almost totally re-filled again.

Figure 5:
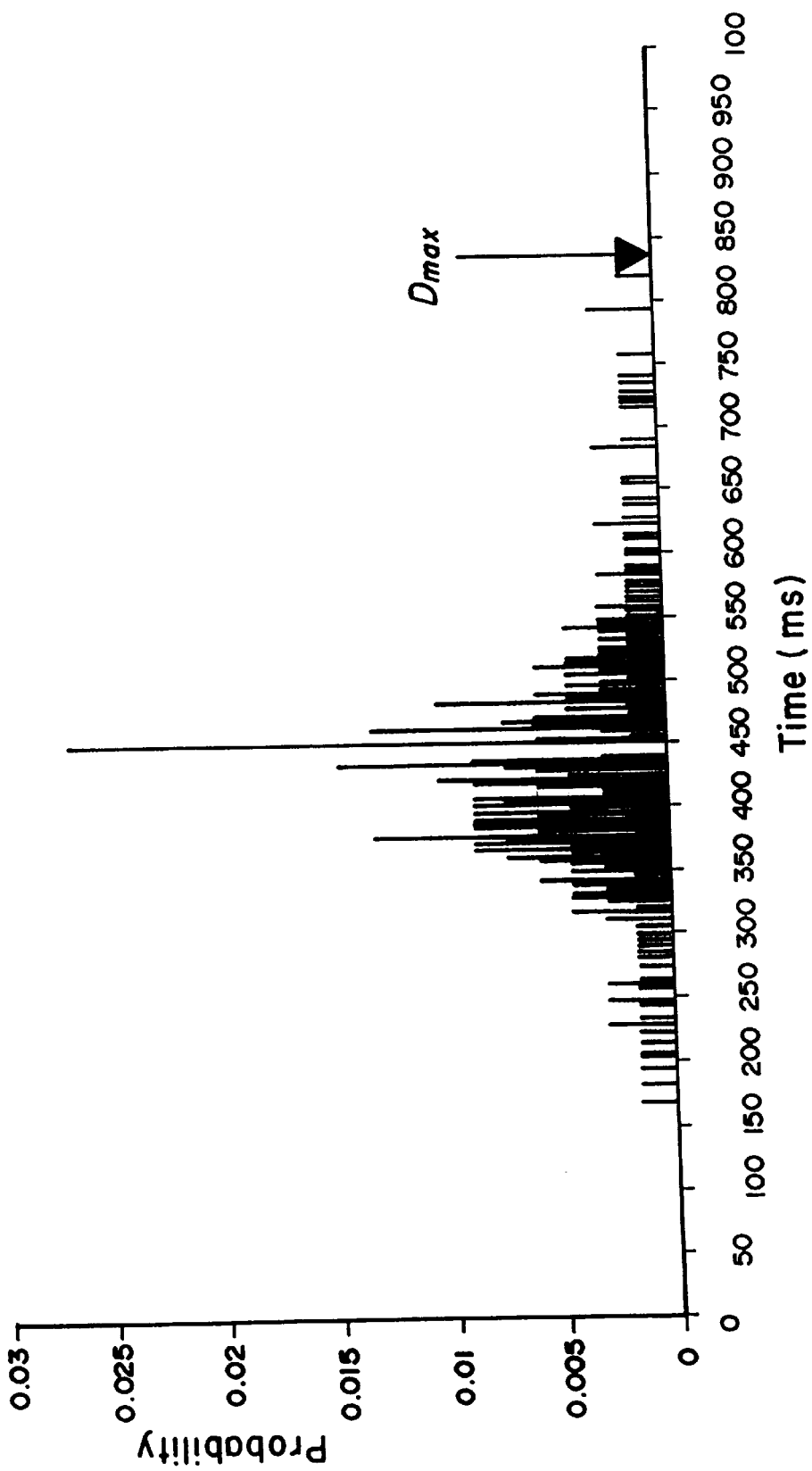
FIG. 5 shows an empirical server response time distribution in the present invention.

To ensure continuous presentation at the client computer, if there is no server failure, the number B depends on a number of factors. First, that number depends on the maximum duration in time $D_{MAX}$ between a client requesting a striping unit from a server and the client completely receiving the unit. FIG. 5 shows an empirical server response time distribution and the corresponding $D_{MAX}$. The methods to generate the data in FIG. 5 should be obvious to those skilled in the art, and will not be further described in this application.

The number B also depends on the minimum amount of time T required by the client computer to present information in one striping unit, or the playback time for one striping unit. In one embodiment, $$B >= (D_{MAX}/T) + 1 \qquad (1)$$

The above equation sets the client buffer needed to ensure that server data will be received in time for playback.

If there is server failure, to maintain continuous playback, the client computer needs additional buffer to store one or more redundant symbols for each piece of information, or for each stripe.

As an example for single server failure, for a (N, N−k) RS-code, at least (N−k) out of the N stripe units are required to reconstruct the original data. One should have received the first (N−k) stripe units in the buffer every time a stripe unit is consumed for playback. Let n be the number of buffer units used for storing data stripe units, then equation 1 becomes:

$$(n-(N-k))T >= D_{MAX}$$

Then additional buffers are needed for the redundant units or symbols. Assume that r redundant units are transmitted along with the data units, in one embodiment, $$B >= n + \lceil n/(N-k) \rceil r$$

where $\lceil x \rceil$ denotes the integer immediately larger than x if x is not an integer.

Figure 6:
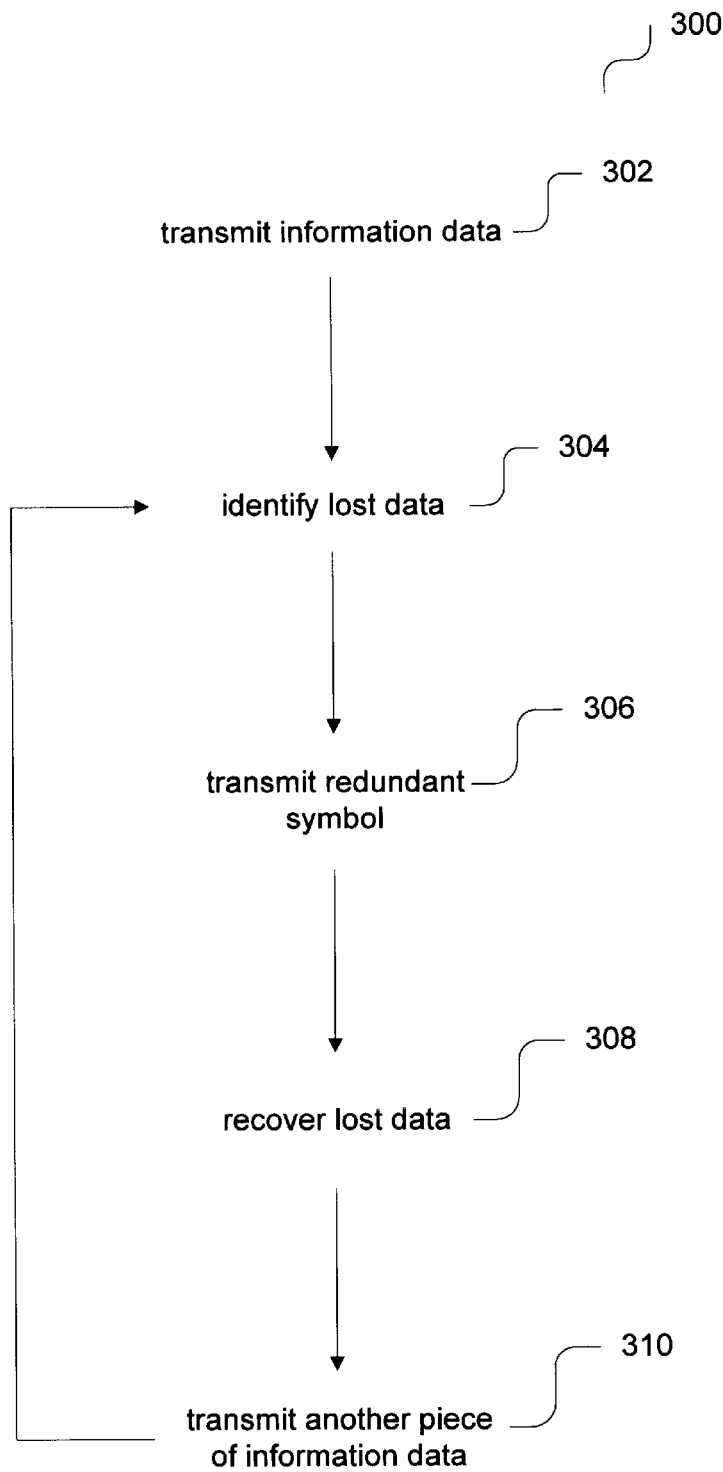
FIG. 6 shows one set of steps to implement another embodiment of the present invention.

In the above embodiments, redundant symbols are always transmitted. In another embodiment, in the beginning with no server failure, redundant symbols are not transmitted. Only when one or more servers fail, redundant symbols will be transmitted. Such an approach is known as On-Demand Correction. FIG. 6 shows one set 300 of steps to implement such an approach. With no server failure, the server computers transmit (Step 302) server data to the client computer, with the server data including a piece of information. Then, at least a part of one server computer fails, and data are lost. The client computer identifies (Step 304) the lost data. The identification process can be similar to the steps shown in FIG. 4. After the identification, at least one of the non-failing server computers transmit (Step 306) at least one additional redundant symbol over what was previously transmitted to the client computer. In this embodiment, when there is no server failure, the servers do not transmit any redundant symbols. Only when there are data lost, redundant symbols will be transmitted. Using the one or more redundant symbols, the client computer recovers (Step 308) the lost data. The recovery process can be similar to what have been previously described. From now on, the server data transmitted by the remaining non-failing server computers include the one or more redundant symbol. The above steps are then repeated from the step of identifying lost data (Step 304). If one or more additional servers fail, additional redundant symbols will be transmitted to the client computer to recover the additional lost data.

A number of aspects in this embodiment are similar to the embodiments where one or more redundant symbols are always transmitted. For example, the number of redundant symbols transmitted with a piece of information corresponds to the number of server computers that can fail simultaneously while the client computer can still recover the lost data. It will be up to the users to decide as to the degree of fault tolerance desired.

The On-Demand Approach is also suitable to transmit video streams where the outputs from the client computer should be continues even when there is one or more server failure. Again, the client computer includes a buffer to hold a number of striping units before presenting any information if there is no failure in any server. The number of units retained again depends on (a) the maximum duration in time between the client requesting a striping unit from a server, and the client receiving the unit; and (b) the time required by the client computer to present information in one striping unit.

To preserve continuity in the video stream even if there is server failure, the number of striping units stored in the buffer of a client computer also depends on the number of redundant symbols transmitted with each piece of information. However, the number of buffers may not be the same in this embodiment as compared to the embodiment where redundant symbols are always transmitted.

Figure 7:
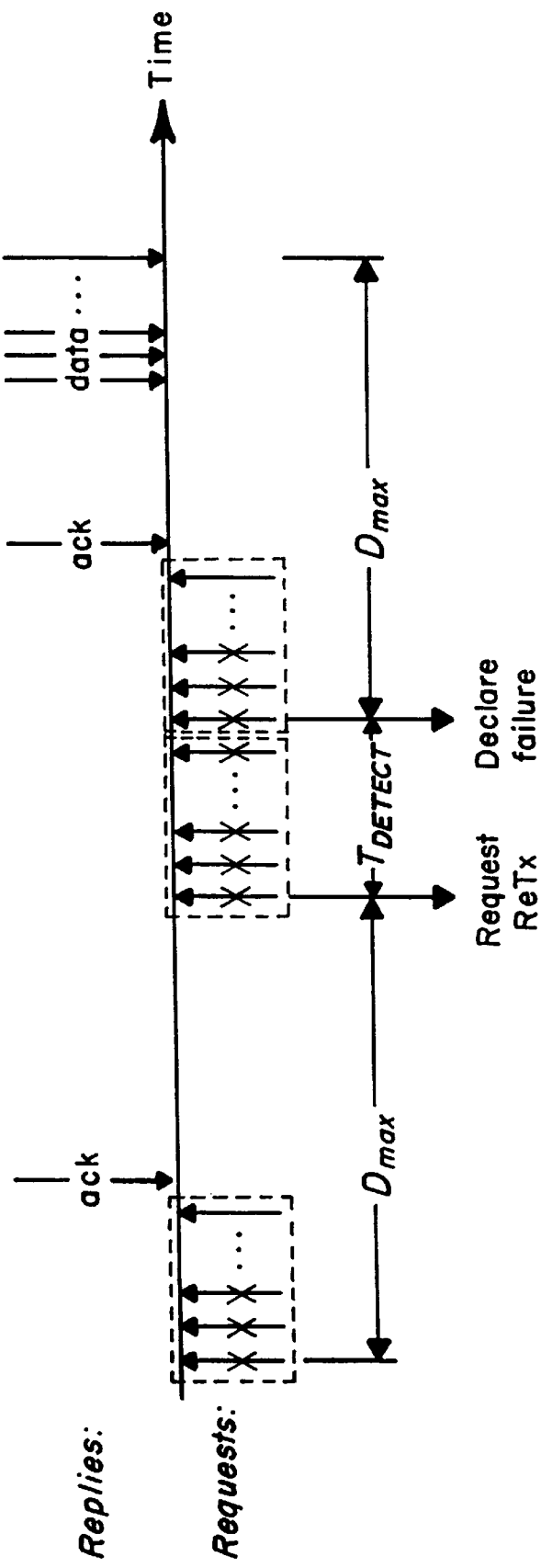
FIG. 7 shows the worst case in delays due to failure in a server for one example of the present invention.

As an example for single server failure, the worst-case in delays due to failure occurs when the server fails immediately after acknowledging a request from a client without servicing it. This scenario is depicted in FIG. 7. Under this worst-case scenario the server failure will be detected when retransmission requests are sent to the failed server after a time $D_{MAX}$. Equation (1) should then be modified as:

$$B >= (2D_{MAX} + T_{DETECT})/T + (N-k)$$

with $T_{DETECT}$ being the time to detect failure.

The invention will be further clarified by a consideration of the following examples, which are intended to be purely exemplary of using the invention. The examples demonstrate the fault-tolerance capability of different embodiments of the present invention. In the examples, four servers were run using distributed single parity coding, which means transmitting only one redundant symbol per piece of server data. In all cases, client video continues playback without interruption during and after one server failure.

Figure 8:
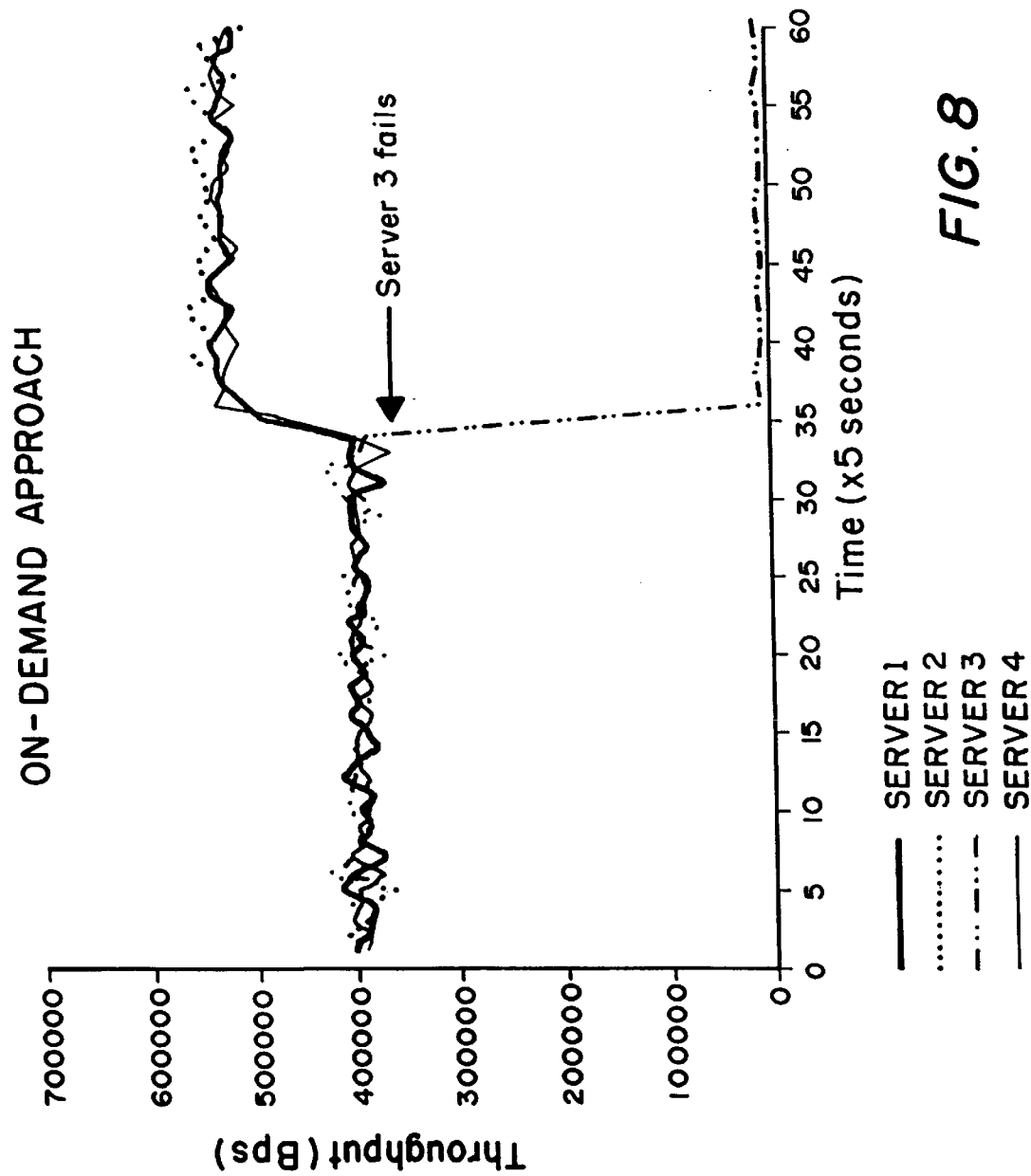
FIG. 8 shows experimental results of throughputs for one server failure using the on-demand approach of the present invention.

FIG. 8 shows the test result for the four servers and 10 concurrent video sessions. Fault tolerance is supported using the On-Demand approach. Server 3 is terminated after 3 minutes. All clients detect the fault and subsequently enter failure-mode operation. The extra retrieval of parity data results in increases in server throughput in bytes per second after the failure. In this case, transmission overhead for the parity data is (1/(4−1)) or 33%, which agrees with the results shown in FIG. 8.

Figure 9:
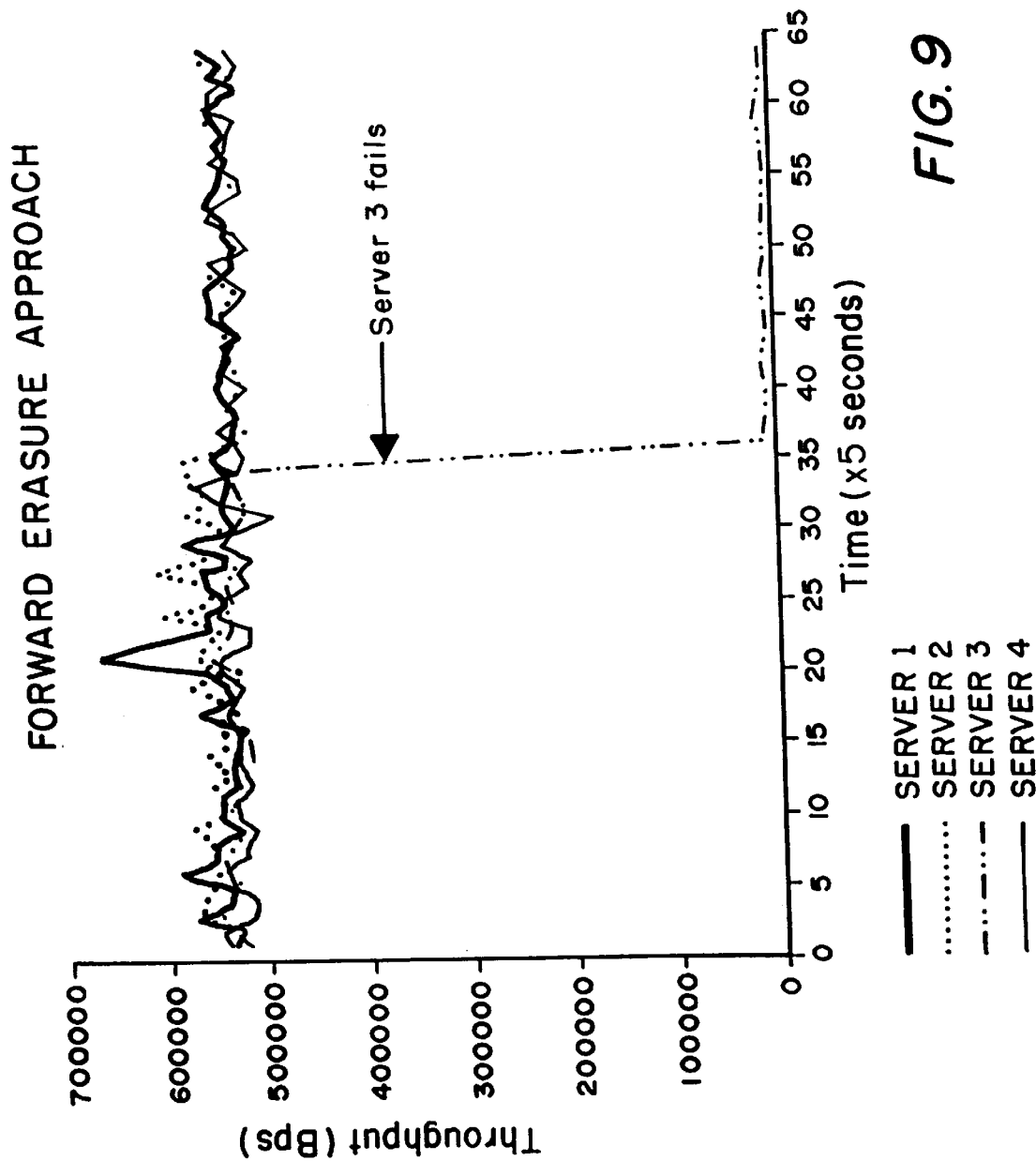
FIG. 9 shows experimental results of throughputs for one server failure using the forward-erasure approach of the present invention.

FIG. 9 shows a similar test for the forward-erasure approach. Same as the previous case, server 3 is terminated after 3 minutes. Although the clients have detected the fault, no special actions need to be taken because parity data are always transmitted. Hence there is no increase in server throughput after the server failure. Rather, the transmission overhead (33%) exists before and after server failure.

Figure 10:
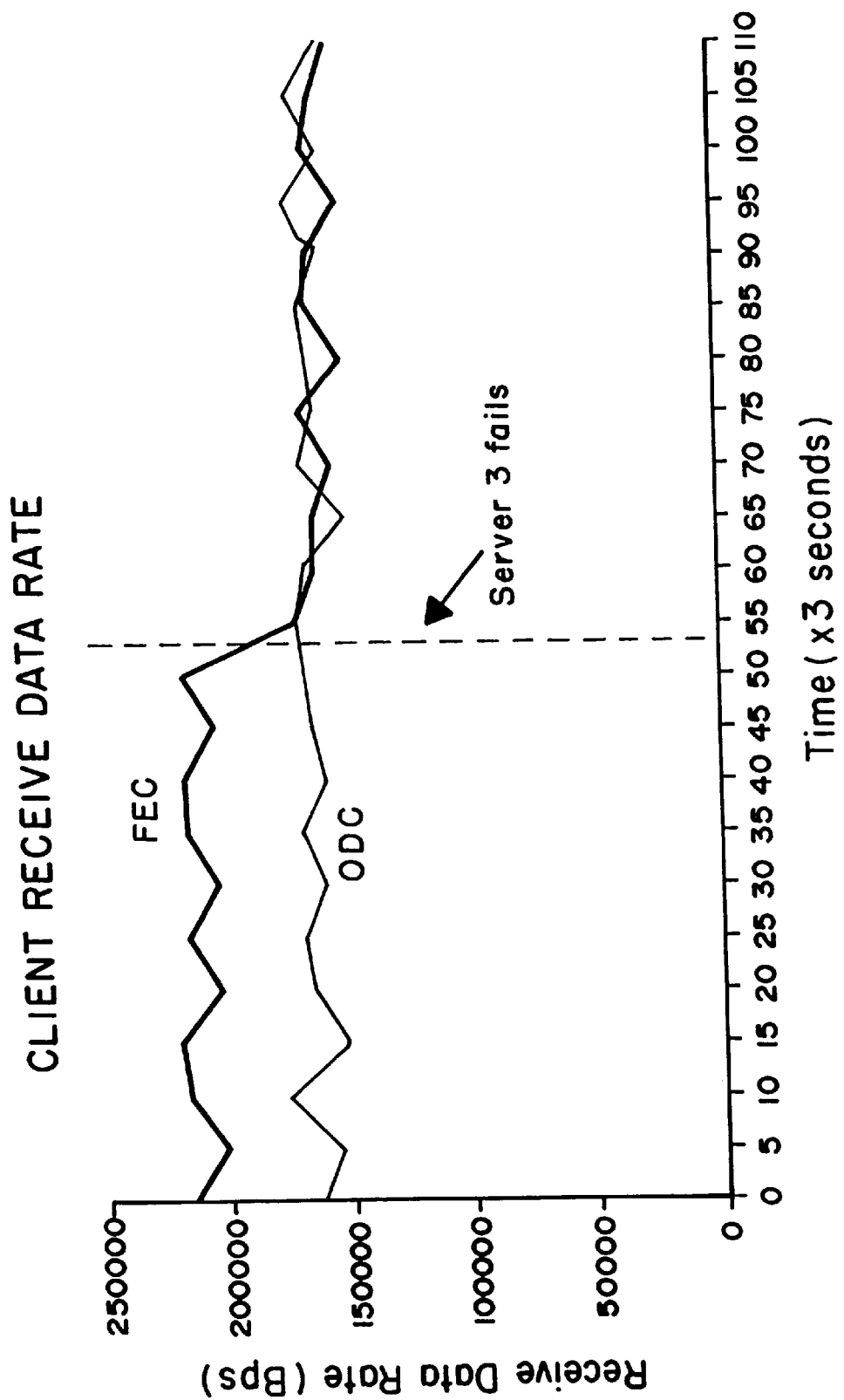
FIG. 10 shows experimental results of the client receive data rate for the on-demand approach and the forward-erasure approach of the present invention.

FIG. 10 depicts the client receive-data rate for the forward-erasure approach and the on-demand approach. As expected, the forward-erasure approach requires more network bandwidth during normal operation. After the server failure, the receive-data rate for both approaches become similar.

Experimental results, such as those in FIGS. 8–10, show that the present invention can perform lost data recovery and maintain video service continuity in the midst of server failure. Also, as shown in FIG. 8, the on-demand approach does not need to transmit redundant symbols during normal operating condition—Redundant symbols are transmitted only after server failure. Consequently, the system loading is reduced during normal operating condition, giving a better delay response to all services.

In the present invention, server computers are synonymous with servers, and client computers are synonymous with clients. Both clients and servers are typically computers, except that users typically access information in server computers through their corresponding client computers.

In one embodiment, the striping units are marked so that they can be transmitted by the server computers out of the sequence of presentation by a client. The client computer will re-arrange the received striping units before presenting them.

In most embodiments, the present invention only describes one client computer requesting information. However, a number of client computers can request at the same time.

The present invention sometimes describe units, and sometimes symbols. As described above, a unit can contain one or more symbols. In most of the embodiments described, to clarify the invention, the description treats a unit having only one symbol. It should be obvious that the present invention is applicable to a unit having a number of symbols.

In the present invention, if there is failing of at least a part of a server computer, at least some of the data that should be transmitted by the server computer to a client computer are lost. For a non-failing or working server computer, the data that should be transmitted by that server computer to a client computer are not lost by the server.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A method to recover lost data in a piece of information transmitted from a plural server computers to a client computer, the method comprising the steps of:

transmitting by the server computers one set of server data to the client computer, the set of server data including the piece of information and at least one redundant symbol;

identifying lost data by the client computer in the server data due to the failing of at least a part of one of the server computers;

recovering the lost data by the client computer using the one or more redundant symbols; and transmitting by the remaining non-failing server computers another set of server data, which includes another piece of information with at least one additional redundant symbol over the server data previously transmitted to the client computer, with the redundant symbols based on the another piece of information, so that the client computer can recover additional data lost due to the failing of at least a part of another server computers;

wherein:

the transmission of information from the server computers is activated by a client's request;

the piece of information can be divided into one or more striping units;

the client computer can present the received piece of information;

the method further comprises the step of the client computer retaining a plurality of striping units before presenting any information if there is no server failure; and the number of units retained depends on (1) the maximum duration in time between the client requesting a striping unit from a server, and the client receiving the unit; and (2) the time required by the client computer to present information in one striping unit.

2. The method as recited in claim 1 further comprising the step of repeating from the step of identifying after the step of transmitting by the remaining non-failing server computers.

3. The method as recited in claim 1 wherein the number of redundant symbols transmitted with a piece of information corresponds to the number of server computers that can fail simultaneously while the client computer can still recover the lost data.

4. The method as recited in claim 1 wherein the client computer includes a buffer with sufficient size to at least store one more than the plurality of striping units retained by the client computer.

5. The method as recited in claim 1 wherein the number of striping units retained by the client computer also depends on the number of redundant symbols transmitted with each piece of information for continuity in presenting information by the client computer even when there is failing in at least a part of one server computer.

6. The method as recited in claim 1 wherein the number of striping units retained by the client computer also depends on a failure detection time for continuity in presenting information by the client computer even when there is failing in at least a part of one server computer.

7. The method as recited in claim 1 wherein the piece of information constitute a video stream.

8. The method as recited in claim 1 wherein:

the transmission of information from the server computers is activated by a client's request; and the step of identifying lost data by the client computer comprising the steps of:
  requesting by the client computer for data from a server computer; and
  repeating the step of requesting a pre-determined number of times when the server computer does not transmit the requested data to the client computer;
such that after the predetermined number of times, if the server computer still does not transmit the requested data to the client computer, the server computer is assumed to have failed, and the data requested from the server computer assumed lost.

9. The method as recited in claim 1 further comprising the step of reconstructing a server computer to replace the server with at least a failed part, after the step of identifying.

10. A method to recover lost data in a piece of information transmitted from a plurality of server computers to a client computer, the method comprising the steps of:
  transmitting by the server computers one set of server data to the client computer, the set of server data including the piece of information;
  identifying lost data by the client computer in the server data due to the failing of at least a part of one server computers;
  transmitting by at least one of the non-failing server computers at least one additional redundant symbol over what was previously transmitted to the client computer;
  recovering the lost data by the client computer using the one or more redundant symbol; and
  transmitting by the remaining non-failing server computers to the client computer another set of server data, which include another piece of information and one or more redundant symbol based on the another piece of information;
wherein:
  the transmission of information from the server computers is activated by a client's request;
  the piece of information can be divided into one or more striping units;
  the client computer can present the received piece of information;
  the method further comprises the step of the client computer retaining a plurality of striping units before presenting any information if there is no server failure; and
  the number of units retained depends on (1) the maximum duration in time between the client requesting a striping unit from a server, and the client receiving the unit; and (2) the time required by the client computer to present information in one striping unit.

11. A method as recited in claim 10 further comprising the step of repeating from the step of identifying after the step of transmitting by the remaining non-failing server computers.

12. A method as recited in claim 10 wherein the number of redundant symbols transmitted with a piece of information corresponds to the number of server computers that can fail simultaneously while the client computer can still recover the lost data.

13. The method as recited in claim 10 wherein the client computer includes a buffer with sufficient size to at least store one more than the plurality of striping units retained by the client computer.

14. The method as recited in claim 10 wherein the number of striping units retained by the client computer also depends on the number of redundant symbols transmitted with each piece of information for continuity in presenting information by the client computer even when there is failing in at least a part of one server computer.

15. The method as recited in claim 10 wherein the number of striping units retained by the client computer also depends on a failure detection time for continuity in presenting information by the client computer even when there is failing in at least a part of one server computer.

16. The method as recited in claim 10 wherein the piece of information constitute a video stream.

17. The method as recited in claim 10 wherein:
  the transmission of information from the server computers is activated by a client's request; and
  the step of identifying lost data by the client computer comprising the steps of:
    requesting by the client computer for data from a server computer; and
    repeating the step of requesting a pre-determined number of times when the server computer does not transmit the requested data to the client computer;
  such that after the pre-determined number of times, if the server computer still does not transmit the requested data to the client computer, the server computer is assumed to have failed, and the data requested from the server computer assumed lost.

18. The method as recited in claim 10 further comprising the step of reconstructing a server computer to replace the failed server, after the step of identifying.

* * * * *